Figure 1:
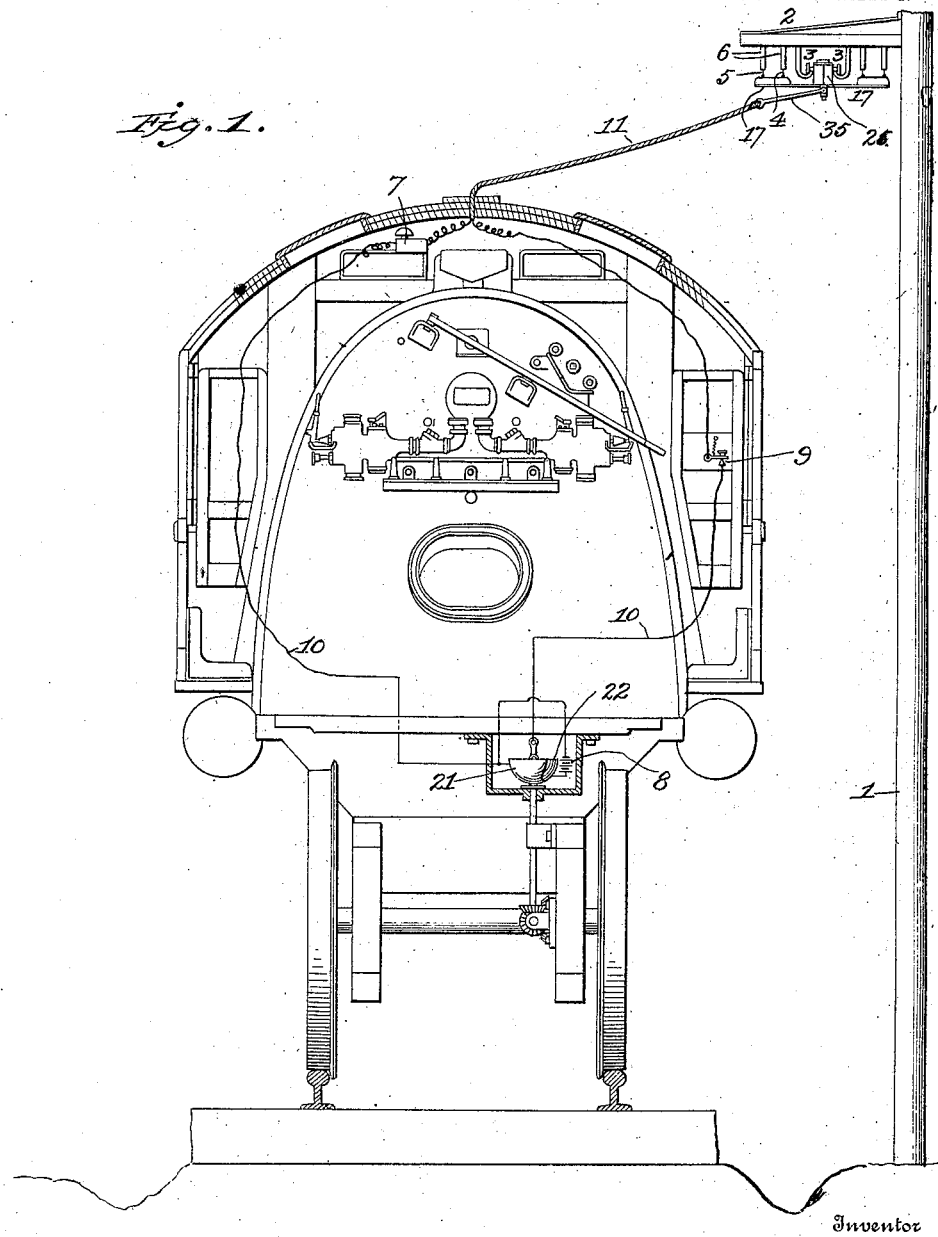

No. 865,781. PATENTED SEPT. 10, 1907.
E. B. HOWELL.
ELECTRIC RAILWAY SIGNALING DEVICE.
APPLICATION FILED JUNE 25, 1906.

4 SHEETS—SHEET 1.

Witnesses
Edwin L. Yewell
Geo. N. Laulin

Inventor
Edward B. Howell,
By
Attorney

No. 865,781. PATENTED SEPT. 10, 1907.
E. B. HOWELL.
ELECTRIC RAILWAY SIGNALING DEVICE.
APPLICATION FILED JUNE 25, 1906.
4 SHEETS—SHEET 2.
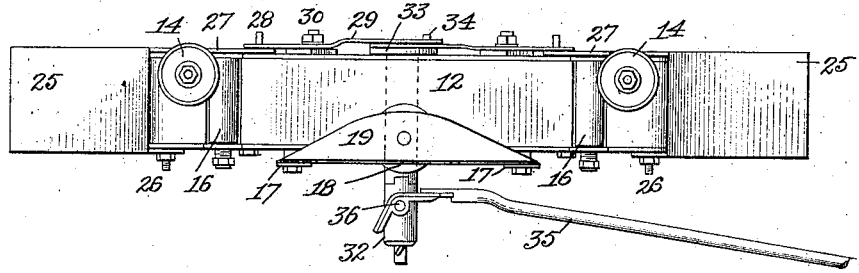
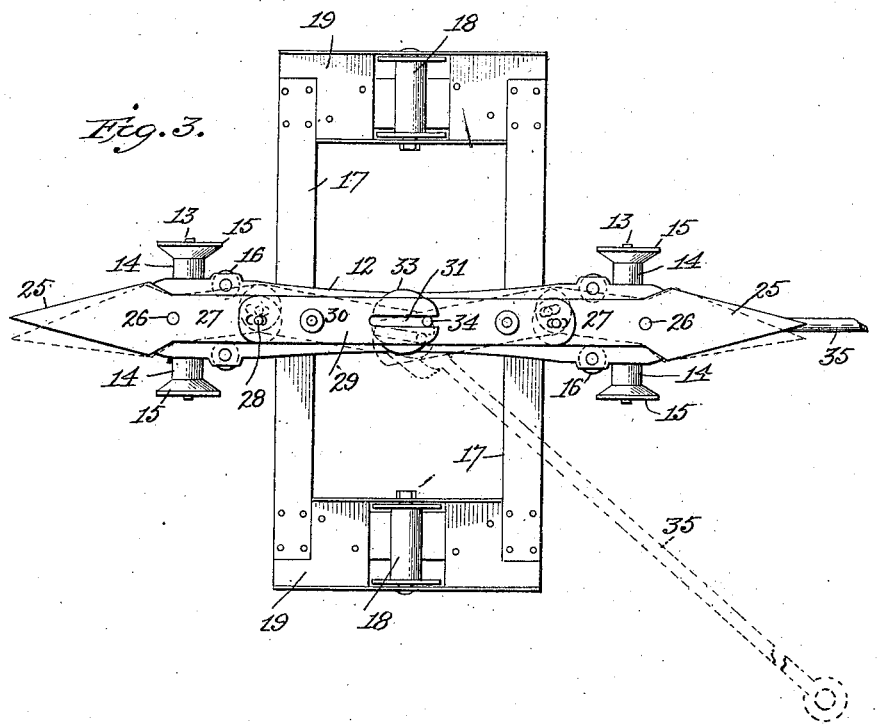

No. 865,781. PATENTED SEPT. 10, 1907.
E. B. HOWELL.
ELECTRIC RAILWAY SIGNALING DEVICE.
APPLICATION FILED JUNE 25, 1906.
4 SHEETS—SHEET 3.
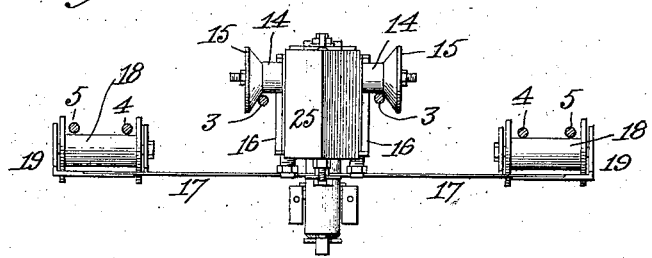
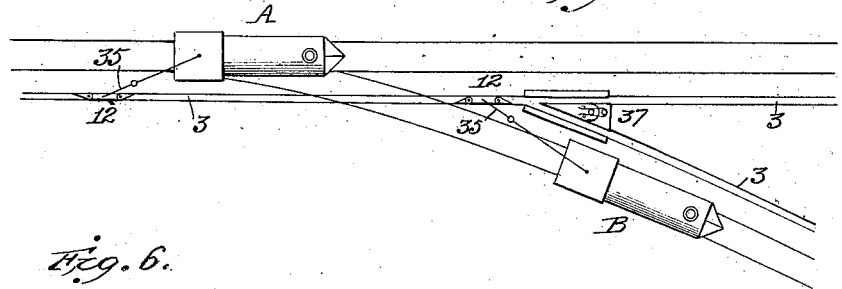
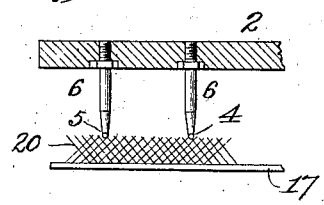
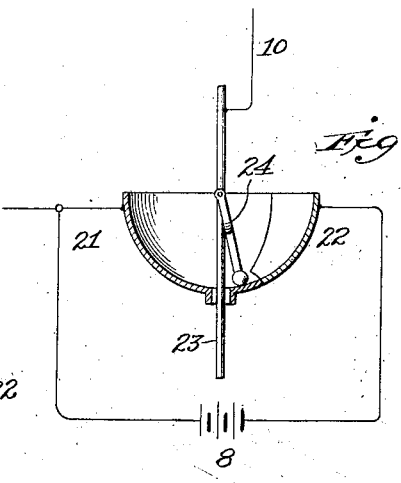
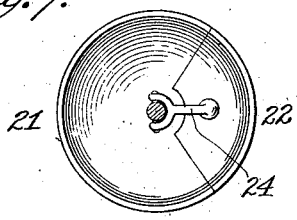

No. 865,781. PATENTED SEPT. 10, 1907.
E. B. HOWELL.
ELECTRIC RAILWAY SIGNALING DEVICE.
APPLICATION FILED JUNE 25, 1906.
4 SHEETS—SHEET 4.
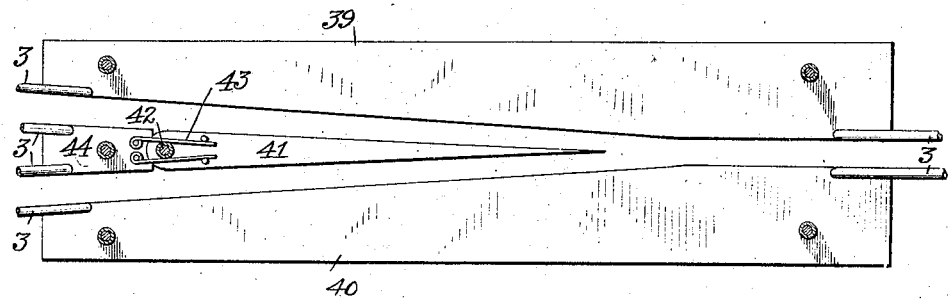
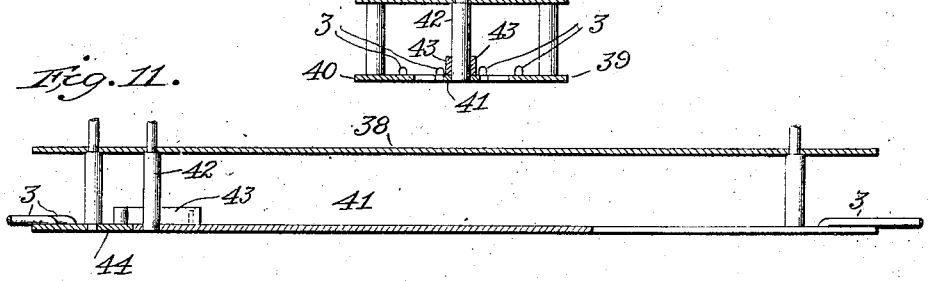
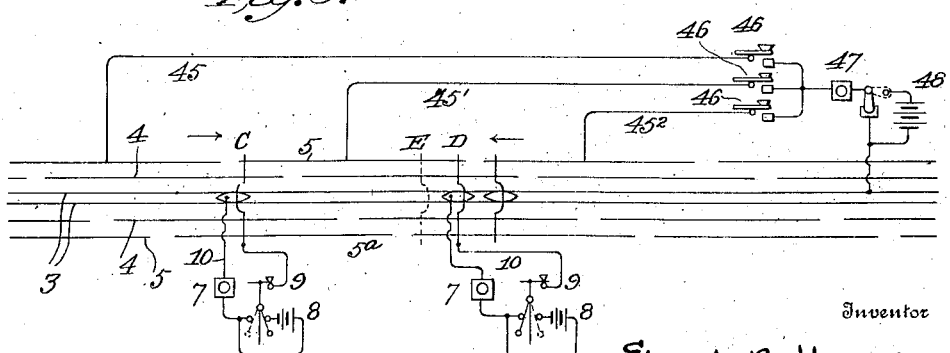
Witnesses
Inventor
Edward B. Howell.
By
Attorney

UNITED STATES PATENT OFFICE.

EDWARD B. HOWELL, OF BUTTE, MONTANA.

ELECTRIC RAILWAY SIGNALING DEVICE.

No. 865,781.   Specification of Letters Patent.   Patented Sept. 10, 1907.

Application filed June 25, 1906. Serial No. 323,377.

*To all whom it may concern:*

Be it known that I, EDWARD B. HOWELL, a citizen of the United States, residing at Butte, in the county of Silverbow and State of Montana, have invented new and useful Improvements in Electric Railway Signaling Devices, of which the following is a specification.

This invention relates to electric signaling devices for railway trains or vehicles, and especially to those systems in which a signal is given automatically in each of two vehicles approaching each other on the same track, when they come within a predetermined distance of each other.

The invention also has reference to systems in which the station agent can communicate with the engineer or other official on any vehicle in his division, this being accomplished without interfering with the automatic electric alarm between approaching vehicles.

My invention comprises a plurality of insulated wires stretched near the railway track and parallel with each other, some wires being divided into insulated sections, and the joints between these sections being staggered. On each vehicle such as a locomotive, is placed a battery and a bell or other electrically operated signal, together with a normally closed switch. These elements are connected in series and the terminals of the circuit are connected by suitable conductors with two contacts or brushes mounted on a carrier or shuttle which is arranged to travel on two of the wires and is connected with the vehicle by a flexible cable in which the conductors are embodied. By this construction, the battery and bell are always in circuit with the line wires. When two vehicles approach so closely that their shuttles make contact with the same pair of line wires, the bells in both vehicles will ring, thus indicating to the drivers that they are dangerously near to each other.

To avoid the necessity for reversing switches to maintain the batteries in operative relation to the line when a vehicle is running backwards without being turned end for end, and also to insure the giving of a signal when a rear collision is liable, I provide on each vehicle a rotating circuit interrupter, which periodically cuts out the battery, thus leaving the bell free to be energized by the battery on the other vehicle during such time as the local battery is cut out.
Details of the shuttle, the overhead switches and the battery cut-out device, together with those of the shuttle and the switches for the line wires, will be explained in full hereinafter.

In the accompanying drawings, Figure 1 is a rear elevation of a locomotive equipped with my improved signaling apparatus. Fig. 2 is a side elevation of the shuttle, on a larger scale. Fig. 3 is a top plan view of the same. Fig. 4 is an end view of the shuttle. Fig. 5 is a diagram showing the operation of the shuttle in approaching a switch in the railway track. Fig. 6 shows a modified contact for the shuttle. Fig. 7 is a plan view of the battery cut-out. Fig. 8 is a sectional elevation of the same. Fig. 9 is a diagram showing the sectionalized line wires and the keys at the station connected therewith. Fig. 10 is a plan view of the line wire switch, on a larger scale. Fig. 11 is a sectional longitudinal section of the same. Fig. 12 is a cross section thereof.

Referring to Fig. 1 it will be seen that I provide, preferably at the side of the track, an overhead structure supported on poles 1 and brackets 2, and comprising a plurality of line wires preferably six in number, the inner ones 3 being somewhat heavier than the outer ones 4, 5, and all suitably supported by hangers 6 depending from the bracket. As appears in Fig. 9, the wires 3, are continuous, but the wires 4, 5, are made in sections, insulated from each other, and the joints in the several wires are staggered as shown.

The railway vehicle may be of any kind; I have shown a steam locomotive. In the cab of the locomotive is placed an electric bell 7, a battery 8 and a normally closed key or circuit-closer 9, all of these elements being preferably connected in series. The terminals of the circuit 10 are connected with some suitable traveling contact moving with the locomotive and making contact with the line wires. Preferably I lead the two conductors through a flexible cable 11 to a shuttle supported on the line wires 3 and running thereon as on a track.

The shuttle is shown in detail in Figs. 2, 3 and 4. It comprises, preferably, a body 12 of wood or other insulating material. The body is rather long, and is of a width adapting it to run easily between the wires 3. At each end, near its top, are outwardly extending studs 13, on which are journaled the wheels 14, having flanges 15 at their outer ends. Adjacent to the wheels are upright rollers 16 suitably journaled and projecting beyond the sides of the body. The flanged wheels support the shuttle on the wires 3 and the rollers prevent it from rubbing against said wires. The shuttle can thus move along the wires with the utmost ease.

Transverse arms 17 extend from the shuttle, and are insulated from the body thereof. They are preferably composed of resilient metal, and carry at their outer ends suitable current collectors or contacts. In Figs. 2, 3 and 4 these consist of rollers 18 journaled in frames 19 fastened to the ends of the arms. The rollers bear against the under side of the line wires 4, 5, as shown in Fig. 1. In place of the roller, any other desired contact may be used; such for instance as wire brushes 20, as shown in Fig. 6. There are preferably two sets of wires arranged at opposite angles, so as to partly inclose the line wires and insure good contact therewith.

One terminal of the circuit 10 on the cab is connected to the shuttle wheels, so as to be in constant circuit with the line wires 3, which, as has been stated, are continuous. The other terminal of the cab circuit is connected with the contacts which engage with the sectional line wires 4, 5. If the sections of these wires are, say, two miles long, and there are four wires with their joints arranged at equal distances, then two vehicles will signal each other if they both pass at the same instant upon the opposite ends of any given section. Moreover, no vehicle can approach nearer to another vehicle than one and a half miles without the energizing of the bells on both vehicles.

In such a system as this, where each vehicle carries a battery, with its poles permanently connected to certain contacts so that one pole is always in circuit with the wires 3 and the other with the wires 4, 5, it is necessary to provide some means for cutting out the battery when the vehicle is not running, so that the bell will be free to respond to the battery of an approaching vehicle. It is also necessary to provide for alternately cutting the battery into and out of circuit when the vehicle is running, so that it may energize the bell of another vehicle at regular intervals. The device I prefer to use for this purpose is shown in Figs. 1, 7 and 8. It consists of a stationary bowl of metal, having a large segment 21 and a small segment 22 insulated from each other. A shaft 23 is arranged concentric with the bowl and is geared to the axle of the vehicle so as to be rotated thereby. Hinged on the shaft is a weighted arm 24 whose end is in electrical contact with the inner surface of the bowl; this surface being a hemisphere, and the arm being pivoted at the center thereof, so that it will remain in contact with the bowl in any position it may assume. As the shaft rotates, the arm will be swung outwardly by centrifugal force, and will sweep over the inside of the bowl, making contact with the segments alternately at each revolution. When the vehicle is at rest, the arm hangs downward, as shown in Fig. 8, in which position it remains in contact with the segment 21, since the segment 22 does not reach quite to the shaft. The conductor 10 from the bell is connected with the segment 21, and that running to the key is connected with the shaft, said shaft being insulated from the bowl. One terminal of the battery is connected with the segment 21 and the other with the segment 22. It follows that when the vehicle is at rest, the battery is cut out of the bell circuit, which is kept closed through the segment 21 and the arm 24. But when the vehicle is running, and the arm makes periodic contact with the segment 22, the circuit is at such periods through the battery to the arm. In this way each battery periodically energizes the line wires, so that if an approaching vehicle is in circuit therewith its bell will ring. It will almost never happen that the circuit interrupters of two vehicles will be running in synchronism and in the same phase, so to speak, and unless this occurs, there is no danger of the batteries opposing each other so as to prevent the giving of a signal.

I provide the shuttle with means for making it automatically take the right side of a switch when necessary. The mechanism is shown in Figs. 2 and 3, and the mode of its operation is diagrammatically shown in Fig. 5. At each end of the shuttle-body is a nose 25, wedge-shaped, with the sharp end edge vertical, and hinged to the body on a vertical axis at 26. Extending backwardly from each nose is an arm 27 which is pivotally connected at 28 with a lever 29, fulcrumed on the body at 30 and having in its rear end a longitudinal slot 31. A shaft 32 passes vertically through the body and carries at its upper end a crank disk 33 provided with a wrist pin 34 which engages the slots 31 of the two levers, said levers overlapping at this point, as shown in Fig. 3. An arm 35 is hinged to the shaft 32 below the body, on a transverse axis 36, so that it can move up and down but any angular movement is imparted to the shaft. The free end of this arm is attached to the cable 11 which carries the conductors that connect the vehicle with the shuttle. Inasmuch as the line wires are supported at one side of the railway track, the drag on this cable causes the arm 35 to stand at an angle to the body of the shuttle, thereby partially rotating the shaft 32 and causing the wrist pin to throw the levers to one side. This turns both of the noses towards that side of the shuttle, as indicated by the dotted lines in Fig. 3, and as shown in Fig. 5.

Whenever there is a switch in the railway track, a switch is arranged in the line wires, properly located in the angle between the main and side tracks to receive the shuttle at the proper time. If the vehicle is to continue along the main line, the noses of the shuttle keep it from running off on the side line; and similarly, if the vehicle is switched to the side line, the noses of the shuttle will turn to take the right side of its switch. In order to effect this, it is necessary to cross the shuttle line wires over to the opposite side of the track, as indicated in Fig. 5. In this figure the wires 4 and 5 are not shown, for the sake of clearness. One vehicle A is shown on the main line, with the noses of its shuttle ready to take the main-line side of the switch 37. Another vehicle B is shown on the side line with its shuttle just about to enter the switch; the noses of this shuttle having been automatically turned to the proper side to take the side-line side of the switch. The construction of this switch is illustrated in Figs. 10, 11 and 12. The top plate 38 is continuous, and suspended from it are the two jaw plates 39, 40, lying in the same plane and having between them an opening which converges towards one end. In the wider end of this opening is located the tongue 41 of the switch, which is pivoted to a stud 42 depending from the top plate 38, and is maintained in a central position by means of a spring 43 mounted on an intermediate plate 44. The wires 3 are attached to the jaw plates at one end of the opening, and their continuations along the main line and side line are attached to the jaw plates and the intermediate plate; in all cases close to the edges of said plates. When the shuttle arrives at such a switch, the wheels 14 roll along on the jaw plates, and the nose of the shuttle enters between the tongue of the switch and the jaw plate towards which it is turned, thereby crowding the tongue over to make room for the shuttle to pass on the proper side of it to proceed to the main line or the side line, as the case may be.

In Fig. 9 is illustrated the mode in which the station agent or train despatcher can signal to any train in any section of the line. One of the sectional line wires as 5, has each section connected by a wire 45, 45', 45² with the station, in which keys 46 are placed, one for each section. The keys are connected in multiple with a bell or other signaling instrument 47 and with the track wires 3 so that by closing any key the despatcher can ascertain if a train is in that block or section; the signaling instruments at the station and on the train being energized intermittingly by the train battery if such is the case. Should he wish to signal the train, he can switch in a battery 48, and by holding the circuit closed, the train bell will ring continuously. It is evident that the station battery must have its poles connected to the track and line wires in opposite relation to the poles of the train batteries, so as to act in series with them or any of them when signaling to a train.

Fig. 9 illustrates diagrammatically how two vehicles or trains will automatically signal each other when they both pass upon the same section of the line wires. If these sections are each two miles in length, and the four lines 4 and 5 have their sections regularly staggered, as shown, then two vehicles can never get within less than a mile and a half of each other without a signal being given on each; while it may be given when they are two miles apart, if both enter on the same section at the same instant. Thus, the vehicles C, D, are represented as both entering on the same section of one wire 5 at the same instant, so that both bells 7 will ring. If vehicle D had run in on the section to the point E before the vehicle C entered thereon, it would still be a mile and a half from it. If the vehicle D had proceeded any further before the vehicle C entered on section 5, it would have entered upon a section 5ᵃ of the other wire with which the vehicle C was already in contact, so that the signal would have been given at the mile and a half point.

The advantage in using more than two staggered signaling conductors arises from the fact that the minimum distance within which two trains can approach each other increases directly with the number of conductors. Thus with only two conductors, where the joints in one come opposite the middle of the sections in the other, the trains may approach within one half the length of a section before signaling. With three conductors, the joints coming successively along the track at distances apart equal to one third of a section, the trains will signal at a minimum distance of two thirds of a section. With four conductors, equally staggered, signals will be given at not less than three fourths of a section length. In other words, the greater the number of conductors, the more nearly will the minimum signaling distance approach the length of a section; a condition which of course affords a greater degree of safety.

What I claim and desire to secure by Letters Patent is:

1. In an automatic electric railway signal, the combination with a vehicle, of a stationary overhead structure at one side of the railway track comprising continuous track wires having a continuous unobstructed space between them, sectional line wires on each side of said track wires, a device traveling on and supported by and between said track wires and carrying on each side below said wires an insulated contact in circuit with the line wires, and signaling instruments on the vehicle connected with the traveling device and the contact thereon.

2. In an automatic electric railway signal, the combination with a vehicle, of a stationary overhead structure at one side of the railway track comprising continuous track wires having a continuous unobstructed space between them, sectional line wires on each side of said track wires and having their joints staggered, a device traveling on said track wires and supported between them, and carrying on each side an insulated arm making contact with said sectional wires, signaling instruments on the vehicle, and a flexible cable connecting them with the traveling device and its contact arm and serving to draw said device along with the vehicle.

3. In an automatic electric railway signal, the combination with two continuous track wires, of a shuttle having a body adapted to run between them, supporting wheels on each side of said body, upright rollers mounted on said body, and noses at each end of said body pivoted on upright axes.

4. In an automatic electric railway signal, the combination with two continuous track wires, of a shuttle having a body adapted to run between them, supporting wheels on each side of said body, upright rollers mounted on said body, and noses at each end of said body pivoted on upright axes, and means for simultaneously turning said noses to one side or the other of said body.

5. In an automatic electric railway signal, the combination with two continuous track wires, of a shuttle having a body adapted to run between them, supporting wheels on each side of said body, upright rollers mounted on said body, and noses at each end of said body pivoted on upright axes, and means for simultaneously turning said noses to one side or the other of said body comprising an upright shaft journaled in said body, and connections between said shaft and said noses.

6. In an automatic electric railway signal, the combination with two continuous track wires, of a shuttle having a body adapted to run between them, supporting wheels on each side of said body, upright rollers mounted on said body, and noses at each end of said body pivoted on upright axes, and means for simultaneously turning said noses to one side or the other of said body comprising an upright shaft journaled in said body, a crank on said shaft, and levers connecting said crank and said noses.

7. In an automatic electric railway signal, the combination with a vehicle, of a stationary overhead structure at one side of the railway track comprising two continuous track wires, a shuttle adapted to run on said wires and provided with noses pivoted on upright axes, an upright shaft in said shuttle connected with said noses, an arm on said shaft, and a flexible cable connecting said arm with said vehicle.

8. In an automatic electric railway signal, the combination with a vehicle, of a stationary overhead structure at one side of the railway track comprising continuous track wires and sectional line wires, a shuttle adapted to run on the track wires, insulated arms extending from said shuttle, and contact devices on said arms bearing against said line wires.

9. In an automatic electric railway signal, the combination with a vehicle, of a stationary overhead structure at one side of the railway track comprising track wires and sectional line wires, a shuttle provided with wheels adapted to run on the track wires, insulated resilient arms extending from said shuttle, and contact devices on said arms urged upwardly thereby against said line wires.

10. In an automatic electric railway signal, the combination with a main line of railway track and a siding, of a stationary overhead structure located at the same side of the track as the siding and comprising track wires and sectional signaling wires for both the main line and the siding, said wires crossing the siding at the point where it leaves the main line, and a switch for said track wires located in the angle between the main line and the siding.

11. In an automatic electric railway signal, the combination with a vehicle, of a line wire extending along the railway track, a traveling contact moving with the vehicle, a battery on said vehicle, and means for periodically cutting said battery into and out of circuit when the vehicle is moving, but keeping it constantly cut out when the vehicle is standing still.

12. In an automatic electric railway signal, the combination with a vehicle, of a line wire extending along the railway track, a traveling contact moving with the vehicle, a battery on said vehicle, two stationary contacts connected respectively with the terminals of said battery, and a rotatable contact arm driven by the vehicle and adapted when in motion to make contact alternately with the two stationary contacts and serving to periodically cut the battery into and out of circuit with said line wire.

13. In an automatic electric railway signal, the combination with a vehicle, of a line wire extending along the railway track, a traveling contact moving with the vehicle, a battery on said vehicle, a bowl comprising two segments insulated from each other and connected with the terminals of said battery, one of said segments being also connected with the line, and a rotating arm making contact with said segments and connected with the line.

14. In an automatic electric railway signal, a circuit interrupter comprising a bowl having two insulated segments, one of which does not extend to the bottom of said bowl, a shaft concentric with said bowl, an arm on said shaft making contact with said segments, a battery having its terminals connected with said segments, and a line wire connected with one of said segments and with said arm.

In testimony whereof I have signed my name to this specification in the presence of two subscribing witnesses.

EDWARD B. HOWELL.

Witnesses:
WILLIAM F. DAVIS,
KATHRYN T. BRESLIN.